Patented Mar. 18, 1952

2,589,210

UNITED STATES PATENT OFFICE 2,589,210

THERAPEUTIC COMPOSITIONS

Daniel A. McGinty, Grosse Pointe, Mich., assignor to Parke, Davis & Company, Detroit, Mich., a corporation of Michigan No Drawing. Application September 24, 1945,
Serial No. 618,403

11 Claims. (Cl. 167—65)

This invention relates to new therapeutic products. More particularly, the invention relates to therapeutic products containing fibrinogen and a germicidal substance.

One of the objects of this invention is to provide products containing both fibrinogen and a germicidal substance.

Another object of the invention is to provide products possessing both hemostatic and germicidal properties.

Still another object of the present invention is to provide preparations which exert a powerful, prolonged and continuous germicidal effect without the production of foreign body reactions or injury even to delicate tissues such as those of the nose and throat.

A further object of this invention is to provide preparations which when applied to a bleeding portion of the body form a sterile, germicidal, hemostatic pack or clot composed principally of fibrin which adheres firmly to the bleeding area and thereby produces hemostasis by the natural processes.

A still further object of the invention is to provide preparations which when applied to bleeding portions of the body form a pack or clot, composed principally of fibrin, which does not undergo lysis (re-solution) but which is slowly and completely absorbed by the tissues during the healing process.

It is well known that fibrinogen is proteinoid in nature and that it resembles the class of proteins called globulins. It is also well known that fibrinogen is of prime importance in blood clotting due to its conversion into fibrin by the enzyme called thrombin. Fibrin is a fibrous, insoluble proteinoid material which forms the "framework" or foundation for the blood clot. Therefore, without fibrinogen no clotting of human or animal blood can occur. However, fibrinogen is very unstable and it is readily denatured (altered) or converted to fibrin by various means other than thrombin. Both the denaturization and the conversion of fibrinogen to fibrin are irreversible reactions. Thus, if fibrinogen is precipitated as fibrin or altered in any way before being put to its intended use it cannot be converted to fibrinogen and therefore it cannot function in the clotting process. It is known that fibrinogen is rapidly denatured by heat, water, dilute acid and many chemicals. I have found that fibrinogen is also denatured or precipitated by practically all the common germicides. Among the germicides which I have found to be incompatible with fibrinogen are such well known and widely used germicides as phenol, cresols, iodine, the germicides containing heavy metals such as mercurochrome, merthiolate, meroxyl and metaphen, the sulfonamides such as sulfanilamide, sulfapyridine, sulfadiazine and the like and germicidal amounts of quaternary ammonium salts such as cetylpyridium chloride and p-tert-octylphenoxyethoxyethyldimethylbenzylammonium chloride monohydrate. However, I have found that fibrinogen is compatible with alkali and alkaline earth salts of penicillin and that the fibrinogen is not precipitated, denatured or destroyed by these germicides. I have also found that fibrinogen can readily be converted to fibrin by thrombin in the presence of penicillin. I have further found that when these penicillin-fibrinogen solutions are caused to clot by contact with thrombin or by application to a bleeding wound that the fibrin clot formed contains unchanged and active penicillin. The penicillin held in these fibrin clots is very slowly released due to the slow diffusion of the penicillin through the gel-like fibrin clots. Thus a continuous and prolonged germicidal effect is obtained. The fibrin clots formed from my new penicillin-fibrinogen compositions, unlike ordinary fibrin clots, do not undergo lysis even when in contact with bacteria such as staphylococci and streptococci, which produce large amounts of hemolysin, an enzyme known to dissolve fibrin clots. This is an important advantage since when fibrin clots undergo lysis bleeding again takes place. I have further found that the presence of penicillin in these penicillin-fibrin clots does not lessen the rigidity and tensile strength below that of the clots formed when penicillin is omitted.

In accordance with the present invention, I can prepare my new penicillin-fibrinogen preparations by mixing a known amount of a dry water soluble, crystalline penicillin salt, such as the sodium or calcium salt, with a known amount of desiccated fibrinogen. However, I prefer to make my new preparations by dissolving a predetermined amount of the penicillin salt in a measured and assayed saline solution of fibrinogen, sterilizing the solution and then desiccating it from the frozen state under greatly reduced pressure to obtain the dry, powdery, homogeneous penicillin-fibrinogen mixture.

I may apply my new preparations in a number of different ways. They may be dusted onto the bleeding surfaces or they may be applied in the form of their solutions in distilled water, sodium chloride or other substantially neutral salt solutions. These solutions may be conveniently applied by using a syringe with a fine needle and spraying or flooding the bleeding surface. The fibrinogen in these solutions, when applied to the bleeding surfaces, may be allowed to clot by the normal clotting process which takes place in about a minute or it may be instantaneously clotted by the subsequent application of a solution of purified thrombin. The fibrin clot which is formed from these fibrinogen-penicillin solutions adheres firmly to the tissues and produces permanent hemostasis without danger of fibrinolysis due to bacterial action.

These fibrin clots do not produce foreign body reactions such as those produced by gauze packs, sutures and the like. Furthermore, unlike gauze packs which cause bleeding when removed, these clots need not be disturbed, as they are slowly but completely absorbed during the healing process. The penicillin in these preparations is neither washed away from the bleeding surface by the blood nor rapidly destroyed or absorbed but it is slowly released from the clot in small amounts over a long period of time and reaches the injured area continuously, due to its slow rate of diffusion through the clot. Thus, because it is neither washed away, destroyed or rapidly absorbed these preparations make it possible to provide constant and prolonged medication to the injured area.

It is well known that almost all germicides greatly retard the rate of healing when applied to injured tissues. This is true even of such widely used and valuable germicides as sulfanilamide and other sulfanilamide derivatives. However, I have found that the penicillin present in its germicidal combination with fibrin as described for my invention does not retard the rate of healing of burns, cuts, abrasions, incisions, wounds and the like. Moreover, it is not washed away, destroyed or rapidly absorbed from the clot produced. My new preparations therefore make it possible to mechanically protect the injured area and at the same time constantly provide medication without interfering with the natural healing processes.

My new fibrinogen-penicillin preparations are so non-irritating that they may be applied to such delicate, highly vascular and sensitive tissues as those found in the nose and throat without causing injury or irritation. This property becomes of especial importance when treating infected, open, bleeding wounds, burns or abrasions because large amounts of the germicide can be contacted with the tissues without damaging the tissues and causing pain or burning sensations due to presence of the germicide.

The new preparations of the present invention are not suitable for injection or for stopping the flow of blood from severed large blood vessels. These larger blood vessels must be ligated. However, the new preparations are useful in the control of capillary bleeding in addition to their many other diversified uses. For example, they are particularly useful in skin grafting, to anchor the grafts in place and to control oozing bleeding from the donor areas.

The use of these new preparations in anchoring skin grafts eliminates the need for sutures or surgical clips and therefore also eliminates the scars normally present in the area due to the use of such mechanical fastening devices. Moreover, skin grafts anchored in place with fibrin "take" or become an integral part of the external body tissure more rapidly due to the fact that the fibrin controls the bleeding and holds the donor skin tightly to the denuded areas and also provides a natural physiological framework for proliferating fibroblasts thereby forming an artificially produced natural "take" of the graft. These new preparations, when used in skin grafting, may be thought of as a "physiological liquid glue" which when applied to the acceptor area hardens and anchors the donor skin firmly to the treated acceptor area by the fibrin formed in the clotting or "hardening" process. These new products, by virtue of the germicidal quantities of penicillin which they contain, prevent infection in the grafted area. These preparations are especially useful when grafting skin to diseased areas because the penicillin in the fibrin clot prevents lysis of the clot and also because the penicillin exerts its germicidal effect on the infected area over the considerable period of time required for growth of new skin.

These new penicillin-fibrinogen preparations are useful in the treatment of severe burns to prevent loss of plasma and to prevent infection. The burned area is sprayed or flooded with an aqueous solution of one of my new penicillin-fibrinogen preparations and the fibrinogen caused to clot by spraying the area with an isotonic saline solution of thrombin. The fibrin which forms effectively seals the burned area and prevents the loss of plasma while the penicillin contained in the fibrin mass serves to render the area sterile and to prevent further infection.

The new products of this invention may be used to control oozing bleeding and to provide prolonged and efficient medication to the bleeding area. They are also useful for "suturing" superficial wounds. For this purpose the injured area is flooded with an aqueous solution of one of these new preparations, the sides of the cut or incision held in place until clotting takes place and finally the sides of the cut or incision anchored in place with a small piece of adhesive tape. Bleeding is prevented while at the same time penicillin medication is immediately established and continuously maintained over the injured area. Additional advantages in thus using the new products is that healing is more rapid than when other germicides such as sulfanilamide are used and since mechanical sutures or clips are not necessary, scars from these sources are eliminated.

These new penicillin-fibrinogen preparations are also useful in operations on highly vascular tissue of the nose and throat; in brain surgery, in bone surgery; in bleeding incident to drainage, excision, or debridement; and following dental extractions. They may also be used for the control of nosebleed and the control of bleeding during minor operations.

The fibrinogen which I use in the preparation of my new therapeutic products should preferably have a purity of over about 50%, a clot rigidity when clotted of over about 600 mm. of mercury (one hour) and a tensile strength when clotted of over about 40 g. (30 minutes). The purity of a given sample of fibrinogen can be calculated by the use of the formula:

$$\frac{\text{per cent fibrinogen nitrogen}}{\text{per cent total nitrogen}} \times 100 = \text{per cent purity}$$

The clot rigidity of a given lot of fibrinogen when clotted may conveniently be determined using the method of Lalich and Copley (Proc. Soc. Exp. Biol. and Med., 51, 232 (1942)) while the tensile strength of the clot may be determined by the method of Newrath, Dees and Fox (J. Urol., 49, 397 (1943)). These same methods are used to determine the clot rigidity and tensile strength of the clots prepared from my new fibrinogen-penicillin products. The fibrinogen which I use may be prepared from mammalian plasma such as that obtainable from humans, cattle, horses, hogs and like mammals. However, I prefer to use beef plasma as the source of my fibrinogen as it is economical and available in large quantities. This fibrinogen may be prepared, for example, as follows:

1600 cc. of 0.85% sodium chloride solution is added to 1600 cc. of beef plasma and the solution cooled to 0° C. 1728 cc. of 20% alcohol in normal saline (0.85%) is slowly sprayed into the solution with constant stirring. The mixture is centrifuged, the precipitated fibrinogen washed with two 200 cc. portions of 7% alcohol in normal saline and recovered each time by centrifuging. The fibrinogen is suspended in 90 cc. of 2.5% saline and dialyzed against 0.85% saline for three hours. Any undissolved fibrinogen is removed by centrifuging and the fibrinogen solution used as such in the preparation of my new penicillin-fibrinogen products. Alternately, the solution may be desiccated from the frozen state and the fibrinogen-salt mixture used at a later date by dissolving it in distilled water. The solution of fibrinogen prepared as described above has the following characteristics:

| | |
|---|---|
| Volume | 129 cc. |
| Total nitrogen | 3.9 mg./cc. |
| Fibrinogen nitrogen | 3.3 mg./cc. |
| Tensile strength (30 min.) | 99 g. |
| Clot rigidity (1 hr.) | 900+ mm. of Hg |
| Purity | 84.6% |

In the preparation of my new products I find it advantageous to add a small amount of a sugar such as sucrose, lactose or glucose to increase the rate of resolution of the final desiccated preparation. This can be accomplished most conveniently by adding the sugar to the solution of the preparation before desiccation. I have found that the dry preparations, which in solution form contained about 5% sugar before desiccation, are rapidly and completely dissolved on contact with water. I have also found that a small amount of wetting agents such as sodium lauryl sulfate and like wetting agents may also be used to accomplish this same purpose. In this case I prefer that the wetting agent be present in the solutions in a concentration of about 0.5% or lower.

The invention is illustrated by the following examples:

Example 1

100 g. of sucrose is dissolved in 2040 cc. of an isotonic saline (NaCl) solution of fibrinogen. The fibrinogen solution has the following characteristics:

| | |
|---|---|
| Purity | 80.6% |
| Total nitrogen | 3.05 mg./cc. |
| Fibrinogen nitrogen | 2.6 mg./cc. |

The solution is filtered through asbestos and then a solution of 10,000 Oxford units of purified sodium penicillin in 20 cc. of water is added to the filtrate. The solution obtained is water clear and remains so for considerable periods of time. It is sterilized by filtration through a Mandler filter and 10 cc. portions of the sterile solution placed in sterile 20 cc. ampoules. The solution in the ampoules is frozen by refrigeration or by immersing the ampoules in a freezing bath. Some examples of suitable freezing baths are solid carbon dioxide-acetone mixture, solid carbon dioxide-methanol mixture, salt-ice mixture, concentrated hydrochloric acid-ice mixture and the like. The water, in the form of ice, is sublimed from the frozen mixture under greatly reduced pressure and the ampoules sealed. The light yellowish-white porous residue in the ampoule is rapidly and completely soluble in 5 cc. of water or saline. Each ampoule contains about the following quantity of materials.

| | |
|---|---|
| Total solids | 696 mg. |
| Sodium chloride | 86 mg. |
| Sucrose | 500 mg. |
| Penicillin | 1000 Oxford units |
| Moisture | 9.6 mg. (1.6%) |
| Total protein | 90 mg. (total N×6.25) |
| Fibrinogen protein | 60 mg. (Fibrinogen N×6.25) |

The contents of one ampoule dissolved in 10 cc. of distilled water gives a penicillin-fibrin clot having a tensile strength (1 hour) of 45 g. (5 cc.) and a clot rigidity (1 hour) of 600 mm. of Hg (5 cc.).

This preparation may be used as a solution or as a powder for any of the many purposes hereinbefore mentioned.

Example 2

32 cc. of a 1% saline solution of fibrinogen is combined with 5 cc. of an aqueous solution of sodium penicillin (1200 Oxford units per cc.) and the resulting solution sterilized by filtration through a Mandler filter. The fibrinogen solution used in this example has the following characteristics:

| | |
|---|---|
| Total nitrogen | 3.8 mg./cc. |
| Fibrinogen nitrogen | 2.1 mg./cc. |
| Purity | 55% |
| Tensile strength of clot | 68 g. (30 minutes) |
| Clot rigidity | 900+ mm. of Hg (1 hr.) |

10 cc. portions of the sterile filtrate is placed in ampoules, frozen and then dried by sublimation of the ice under greatly reduced pressure. The light yellowish-white powder in the ampoules when diluted with 10 ml. of water contains about 160 Oxford units of penicillin per cc. and a 5 cc. portion of the preparation gives a self-sterilizing fibrin clot containing penicillin which has a tensile strength of 75 g. (30 minutes).

This preparation is suitable for use in the form of a solution or a dust. While the dry form of this preparation does not redissolve as rapidly as the preparation described in Example 1, it can be dissolved sufficiently fast to be used during surgical operations.

Example 3

5 g. of sucrose and 50,000 Oxford units of crystalline sodium penicillin are dissolved in 100 cc. of an isotonic saline solution of fibrinogen. The fibrinogen solution used has the following characteristics:

| | |
|---|---|
| Total nitrogen | 3.7 mg./cc. |
| Fibrinogen nitrogen | 2.8 mg./cc. |
| Tensile strength of clot | 90 g. (30 min.) |
| Clot rigidity | 900+ mm. of Hg (1 hr.) |
| Purity | 75.6% |

The resulting solution is sterilized by filtration through a Mandler filter, frozen and the water, in the form of ice, removed by sublimation under greatly reduced pressure. The resulting yellowish white porous product readily and completely redissolves in water to give a clear solution. If the product is diluted to a volume of 100 cc. with sterile distilled water it is isotonic and contains 500 Oxford units of penicillin per cubic centimeter. 5 cc. of the solution gives a penicillin-fibrin clot which has the same clot rigidity and tensile strength as the fibrin clot prepared from the original fibrinogen solution. This penicillin-fibrin clot, if not separated from the solution in which it is formed, nevertheless does not dissolve, even after seventy-two hours. When the aqueous solution of this new preparation is applied to a bleeding incision, even though the surrounding tissue is infected with such organism as staphylococci and streptococci, practically immediate clotting occurs. This clot does not redissolve even though staphylococci and streptococi are present and able to produce large amounts of hemolysin which is known to ordinarily destroy naturally or artificially produced fibrin clots. This is due to the fact that the continuous diffusion of penicillin through the clot destroys the pathogenic organisms thereby preventing the clot from redissolving. If the incision is first treated with penicillin and then a fibrin clot formed, naturally or artificially, a large portion of the penicillin is washed away by the blood or is rapidly destroyed and undesirable redissolving of the clot occurs.

*Example 4*

5 g. of glucose and 75,000 Oxford units of sodium penicillin are dissolved in 100 cc. of an isotonic saline solution of fibrinogen. The fibrinogen solution used in this example has the following characteristics:

Total nitrogen _____ 3.9 mg./cc.
Fibrinogen nitrogen _____ 2.8 mg./cc.
Tensile strength of clot__ 72.5 g. (30 min.)
Clot rigidity _____ 900+ mm. of Hg (1 hr.)
Purity _____ 72%

The resulting solution is sterilized by filtration through a Mandler filter and 5 cc. portions of the filtrate placed in sterile ampoules. The solutions in the ampoules are frozen, the water, in the form of ice, removed by sublimation under greatly reduced pressure and the ampoules sealed. The light yellowish-white porous residue is readily and completely soluble in distilled water. The dried product in each ampoule when diluted to 5 ml. with sterile distilled water gives a solution which is sterile, isotonic and contains 750 Oxford units of penicillin per cubic centimeter. The contents of one of the ampoules of this preparation diluted to 5 cc. produces a fibrin clot containing penicillin which has the same tensile strength and clot rigidity as the fibrin clot produced from the original fibrinogen solution. This fibrin-penicillin clot does not show any lysis in vitro even after 72 hours and at the end of this time is still strongly germicidal when tested against staphylococci and streptococci.

*Example 5*

5 g. of lactose and 5000 Oxford units of sodium penicillin are dissolved in 100 ml. of an isotonic saline solution of fibrinogen. The fibrinogen solution used has the following characteristics:

Total nitrogen _____ 4.1 mg./cc.
Fibrinogen nitrogen _____ 3.3 mg./cc.
Tensile strength of clot__ 78.5 g. (30 min.)
Clot rigidity _____ 900+ mm. of Hg (1 hr.)
Purity _____ 80.5%

The solution is sterilized by filtration through a Mandler filter, the filtrate frozen and the ice sublimed from the frozen mixture under greatly reduced pressure. The residue is a yellowish-white porous powder which is readily and completely soluble in water or saline. When this penicillin-fibrinogen preparation is dissolved in water the solution is isotonic and contains 50 Oxford units of penicillin per cubic centimeter. 5 cc. of this solution produces a penicillin containing clot having a tensile strength of about 30 g. (30 min.) and a rigidity of 900+ mm. of Hg (1 hr.).

*Example 6*

5 g. of sucrose and 10,000 Oxford units of calcium penicillin are dissolved in 100 cc. of an isotonic saline solution of fibrinogen. The fibrinogen solution used in the preparation of this new product has the following characteristics:

Total nitrogen _____ 4.6 mg./cc.
Fibrinogen nitrogen _____ 3.5 mg./cc.
Tensile strength of clot__ 70 g. (30 min.)
Clot rigidity _____ 900+ mm. of Hg (1 hr.)
Purity _____ 76%

The resulting solution is sterilized by filtration through a Mandler filter and 10 cc. portions of the filtrate placed in sterile ampoules under aseptic conditions. The solutions in the ampoules are frozen, the ice sublimed under greatly reduced pressure and the ampoules sealed. The yellowish-white porous solid product obtained in this manner is sterile and when diluted with 10 cc. of water contains 100 Oxford units of penicillin per cubic centrimeter. This solution produces a clot containing penicillin which has a tensile strength of about 70 g. (30 min.) and a clot rigidity of 900+ mm. of Hg (1hr.). This particular preparation produces a very rapid clot in vivo. This may be due to a certain extent to the fact that the added calcium ions hasten the conversion of prothrombin to thrombin, thereby increasing the rate of clotting.

*Example 7*

0.05 g. of sodium lauryl sulfate and 25,000 Oxford units of calcium penicillin are dissolved in 100 cc. of an isotonic saline solution of fibrinogen. The fibrinogen solution used has the following characteristics:

Total nitrogen _____ 3.25 mg./cc.
Fibrinogen nitrogen _____ 3.2 mg./cc.
Purity _____ 100%
Tensile strength of clot __ 110 g. (30 min.)
Clot rigidity _____ 900+ mm. of Hg (1 hr.)

The resulting solution is sterilized by filtration through a Mandler filter, 10 cc. portions of the filtrate are placed in ampoules, desiccated from the frozen state and the ampoules sealed. The light yellowish-white porous solid product is very rapidly and completely soluble in water. Each ampoule of this preparation contains 2,500 Oxford units of penicillin. The fibrin clots formed from this preparation have about the same tensile strength and clot rigidity as the clots prepared from the original fibrinogen solution.

The pH of my new penicillin-fibrinogen solutions should be between pH's 6 to 8. This also applies to the solution of my new preparations prepared by dissolving the dry preparations in water or salt solutions. However, for the maximum stability of penicillin and fibrinogen I prefer to keep these solutions substantially neutral, e. g. about pH 7.

What I claim as my invention is:

1. A therapeutic composition comprising purified fibrinogen and a water soluble penicillin salt of a metal selected from the class consisting of alkali and alkaline earth metals.

2. A dry, stable therapeutic composition comprising purified fibrinogen and a water soluble penicillin salt of a metal selected from the class consisting of alkali and alkaline earth metals.

3. A dry, stable therapeutic composition comprising fibrinogen and a water soluble pencillin salt of a metal selected from the class consisting of alkali and alkaline earth metals, said fibrinogen having a purity of over about 50% and said composition having a pH of between 6 and 8 when dissolved in water.

4. A dry, stable therapeutic composition comprising fibrinogen, a water soluble penicillin salt of a metal selected from the class consisting of alkali and alkaline earth metals and a solubilizing agent, said fibrinogen having a purity of over about 50%, and said composition having a pH of between 6 and 8 when dissolved in water.

5. A dry, stable therapeutic composition comprising fibrinogen, a water soluble penicillin salt of a metal selected from the class consisting of alkali and alkaline earth metals and a sugar, said fibrinogen having a purity of over about 50%, and said composition having a pH of between 6 and 8 when dissolved in water.

6. A dry, stable therapeutic composition comprising fibrinogen, sodium penicillin and sucrose, said fibrinogen having a purity of over about 50% and said composition when dissolved in water giving a substantially neutral solution.

7. A dry, stable therapeutic composition comprising fibrinogen, calcium penicillin and sucrose, said fibrinogen having a purity of over about 50% and said composition when dissolved in water giving a substantially neutral solution.

8. A dry, stable therapeutic composition comprising fibrinogen, a water soluble penicillin salt of a metal selected from the class consisting of alkali and alkaline earth metals and a small amount of sodium lauryl sulfate, said fibrinogen having a purity of over about 50%, and said composition having a pH of between 6 and 8 when dissolved in water.

9. A dry, stable therapeutic composition comprising fibrinogen, sodium penicillin and a small amount of sodium lauryl sulfate, said fibrinogen having a purity over about 50%.

10. A therapeutic composition comprising an aqueous solution purified fibrinogen and a water soluble penicillin salt of a metal selected from the class consisting of alkali and alkaline earth metals, said solution having a pH between 6 and 8.

11. A therapeutic composition comprising an aqueous solution of fibrinogen having a purity of over about 50%, a water soluble penicillin salt of a metal selected from the class consisting of alkali and alkaline earth metals and a solubilizing agent, said solution being substantially neutral.

DANIEL A. McGINTY.

REFERENCES CITED

The following references are of record in the file of this patent:

Int'l Abs. of Surgery, September 1943, p. 218.
Am. J. Pharmacy, May 1945, p. 182.
J. Lab. & Clin. Medicine, September 1943, pp. 1465-7.
The Pharma. Journal, Nov. 20, 1943, p. 193.
Hager, Handbuch der Pharmazeutischen Praxis (1927), vol. 2, p. 601.